United States Patent
Xiong

(10) Patent No.: US 9,203,321 B1
(45) Date of Patent: Dec. 1, 2015

(54) NON-ISOLATED RESONANT DC-DC CONVERTER WITH BOOST-TYPE VOLTAGE DOUBLER OUTPUT

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 14/194,568

(22) Filed: Feb. 28, 2014

Related U.S. Application Data

(60) Provisional application No. 61/772,384, filed on Mar. 4, 2013.

(51) Int. Cl.
| | | |
|---|---|---|
| *H05B 37/02* | (2006.01) | |
| *H02M 3/335* | (2006.01) | |
| *H05B 33/08* | (2006.01) | |

(52) U.S. Cl.
CPC ....... *H02M 3/33569* (2013.01); *H05B 33/0809* (2013.01)

(58) Field of Classification Search
USPC ................ 315/224, 225, 226, 283, 291, 308; 307/109, 110; 363/34, 37
See application file for complete search history.

(56) References Cited

U.S. PATENT DOCUMENTS

| | | | | |
|---|---|---|---|---|
| 7,453,215 | B2 * | 11/2008 | Zhu ............................... | 315/201 |
| 7,868,482 | B2 * | 1/2011 | Greene et al. ................... | 307/82 |
| 2010/0052554 | A1 * | 3/2010 | Zanforlin ....................... | 315/210 |

* cited by examiner

*Primary Examiner* — Thuy Vinh Tran
(74) *Attorney, Agent, or Firm* — Patterson Intellectual Property Law, P.C.; Mark J. Patterson

(57) ABSTRACT

A light fixture includes a housing, a non-isolated driver circuit with a boost type voltage doubler output stage, and a light source. The load or light source may be a plurality of LEDs. The housing supports the light source and the driver circuit, and the housing may include a lens for the one or more LEDs of the light source. The driver circuit provides power from the power source to the light source. The light source provides light in response to receiving power. The boost type voltage doubler output stage is a voltage doubler output stage having a boost inductor connected between an input (e.g., connected to an output of an inverter of the driver circuit) and an output (e.g., connected to the load or light source) of the boost type voltage doubler output stage.

18 Claims, 5 Drawing Sheets

NON-ISOLATED RESONANT DC-DC CONVERTER WITH BOOST-TYPE VOLTAGE DOUBLER OUTPUT

CROSS-REFERENCES TO RELATED APPLICATIONS

This application claims priority to and hereby incorporates by reference in its entirety U.S. Provisional Patent Application No. 61/772,384 entitled "NON-ISOLATED RESONANT DC-C CONVERTER WITH BOOST-TYPE VOLTAGE DOUBLER OUTPUT" filed on Mar. 4, 2013.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to output stages for DC driver circuits having non-isolated outputs. More particularly, the invention relates to improving efficiency and reducing currents within an output stage of a DC driver circuit having a non-isolated output.

Generally, there are two types of output stages for direct current (DC) driver circuits (e.g., LED power supplies): isolated output and non-isolated output.

An isolated driver circuit (i.e., isolated output power supply) has an output transformer to isolate the output of the driver circuit from the input of the driver circuit. Because the controller is operating on the input side of the driver circuit and the output is isolated from the input, sensing voltage and current conditions in the output stage of the driver circuit at the controller and controlling the output of the output stage is relatively complicated (e.g., requires the use of operational amplifiers for isolation). Additionally, the efficiency of the driver circuit is reduced because power has to pass through the isolation transformer, and the isolation transformer itself adds significant size and cost to the driver circuit.

A non-isolated driver circuit (i.e., a non-isolated output power supply) simplifies output condition sensing and control, increases efficiency, and reduces the costs and size penalties imposed by the isolation transformer in isolated power supplies. However, output noise is an issue in non-isolated power supplies because a full bridge rectifier is typically used.

Referring to FIG. 1, a power source 102 provides power to a non-isolated DC power supply or driver circuit 100 with a full bridge rectifier. The non-isolated DC power supply 100 receives power from the power source 102 at an input stage 104. In one embodiment, the input stage 104 includes an alternating current (AC) to DC converter, an electromagnetic interference (i.e., EMI) filter, and a power factor correction circuit for converting AC power from the power source 102 to DC power rail V_rail. In another embodiment, the power source 102 is a DC power source, and the input stage 104 includes an EMI filter and an optional DC to DC converter, depending on the voltage of the power source 102 and the desired DC power rail voltage V_rail. The non-isolated driver circuit 100 with the full bridge rectifier further includes a controller 106, an inverter 108, and an output stage 110. The controller 106 receives an output current sensing signal I_sense from the output stage 110 and drives the inverter 108 as a function of the current sensing signal I_sense. The output current sensing signal I_sense is indicative of an output current provided to a load R_Load connected to the output stage 110. In one embodiment, the controller 106 alters a frequency of a drive signal provided to the inverter 108 as a function of the current sensing signal I_sense to maintain the output current at a target current.

The full bridge rectifier in the output stage 110 of the non-isolated DC power supply 100 of FIG. 1 electrically isolates the output (i.e., the output to the load R_Load of the output stage 110) from the input (i.e., circuit ground of the inverter 108) such that there is no return path from the output to the input. Thus, there is no return path for common mode noise to return to the circuit ground. If a frame attached to the load R_Load is grounded (i.e., connected to earth ground), then the common mode noise generated by the full bridge rectifier (i.e., D5, D6, D7, and D8) goes through earth ground to return to the circuit ground. This relatively large common mode noise could easily saturate a small common choke in the EMI filter of the input stage 104. As a result, the EMI filter of the input stage 104 needs to be relatively large and correspondingly expensive to stabilize operation of the non-isolated DC power supply 100.

Referring to FIG. 2, the output stage 210 of a non-isolated driver circuit 200 with a voltage doubler output includes a voltage doubler circuit having an input charge capacitor C_charge, an upper diode D3, a lower diode D4, and an output capacitor C1. The output stage 210 also includes a current sensing resistor R_I_sense in series with the load R_Load. The input charge capacitor C_charge is a charge capacitor that stores the energy from the resonant capacitor C_res of the inverter 108. The lower diode D4 is used to charge up the input charge capacitor C_charge. The upper diode D3 is used to pump the energy from the input charge capacitor C_charge to the output capacitor C1 and the load R_Load. The output capacitor C1 is used to filter out AC ripple at the output (i.e., across the load R_Load). Thus, the output is grounded (i.e., connected to ground via the current sensing resistor R_I_sense) and noise at the output has a direct path to return to the circuit ground. As a result, the non-isolated driver circuit 200 is more stable and quieter than the non-isolated driver circuit with full bridge rectifier 100 shown in FIG. 1.

The non-isolated driver circuit 210 with voltage doubler output has an inherent issue because only half of the resonant current from the resonant inductor Lres of the inverter 108 goes through the upper diode D3. Thus, to get the same amount of output current as the non-isolated driver circuit with full bridge rectifier 100, the non-isolated driver circuit with voltage doubler 200 has to put twice as much current through the resonant inductor Lres of the inverter 108. This relatively large current requires a larger and more expensive resonant inductor Lres as well as larger, more expensive inverter switches Q1 and Q2.

Referring to FIG. 3, a plot 300 of resonant inductor current 302 versus time is shown for the non-isolated driver circuit with voltage doubler 200 of FIG. 2 for a 700 mA output current (i.e., current delivered to the load R_Load). The resonant inductor current 302 in the inverter 108 peaks at 2.4 A.

BRIEF SUMMARY OF THE INVENTION

Aspects of the present invention provide a non-isolated driver circuit with a voltage doubler output stage including a boost inductor.

In one aspect, a driver circuit for providing power from a power source to a load includes an inverter and a voltage doubler output stage. The inverter has a control input, a power input, and an output. The power input is configured to connect to a DC power rail. The inverter is configured to provide an AC output signal as a function of a drive signal received at the control input of the inverter. The voltage double output stage has an input and an output. The output of the voltage double output stage is configured to connect to the load. The voltage doubler is configured to convert the AC output signal from the inverter into a DC output signal. The voltage doubler output stage includes a boost inductor connected between the input and the output.

In another aspect, a light fixture includes a light source, a driver circuit, and a housing. The light source is operable to provide light in response to receiving power. The driver circuit is configured to provide power from a power source to the light source. The driver circuit includes an inverter and a voltage doubler output stage. The inverter has a control input, a power input, and an output. The power input is connected to a DC power rail. The inverter is configured to provide an AC output signal as a function of a drive signal received at the control input of the inverter. The voltage double output stage has an input and an output. The output of the voltage double output stage is configured to connect to the light source. The voltage doubler output stage is configured to convert the AC output signal from the inverter into a DC output signal. The voltage doubler output stage includes a boost inductor connected between the input and the output of the voltage doubler output stage. The housing is configured to support the light source and the driver circuit.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
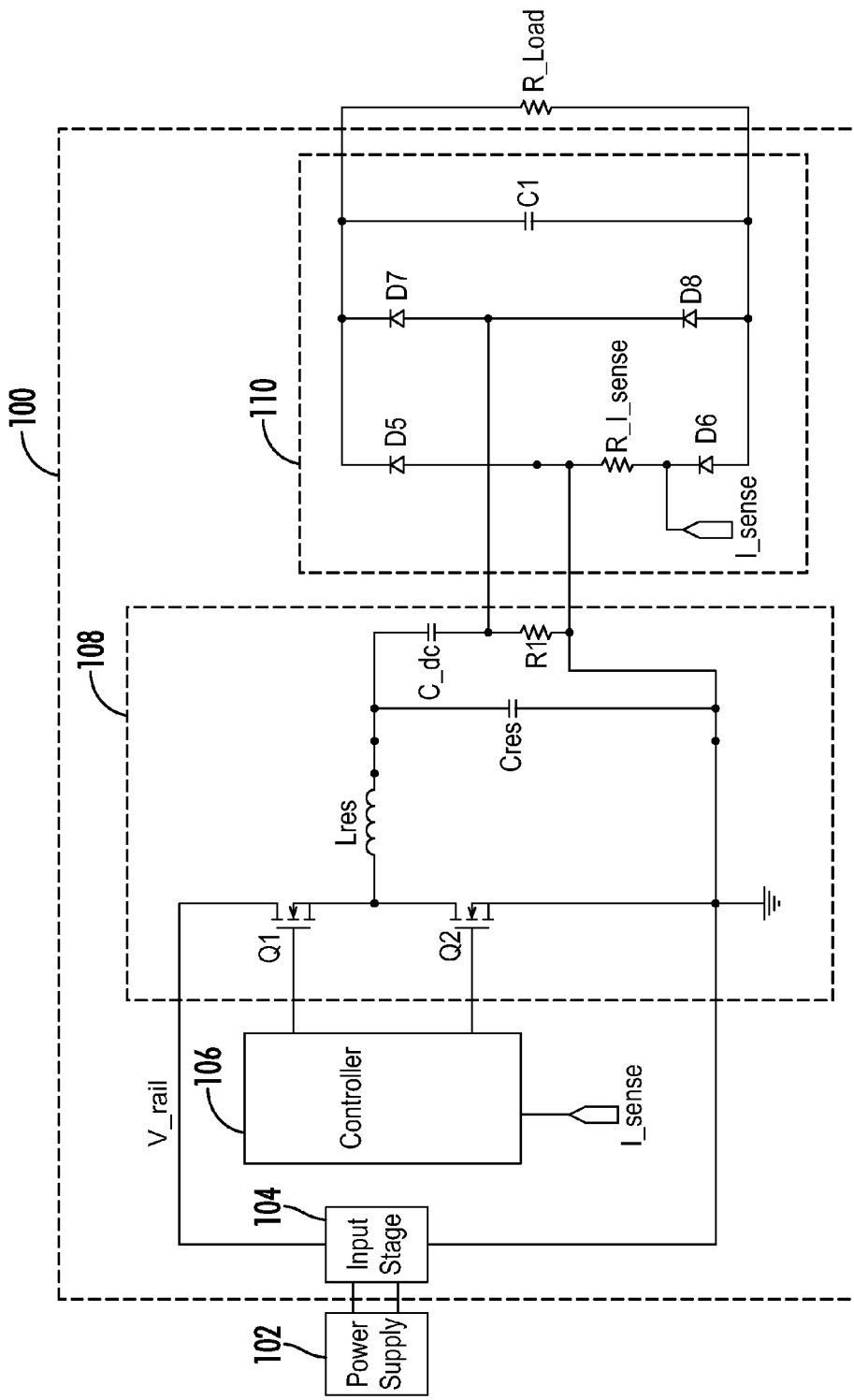
FIG. 1 is a block diagram and partial schematic of a non-isolated driver circuit including a full bridge rectifier output stage as known in the prior art.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The terms "coupled" and "connected" mean at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" means electrically connected when referring to electrical devices in circuit schematics or diagrams.

Figure 4:
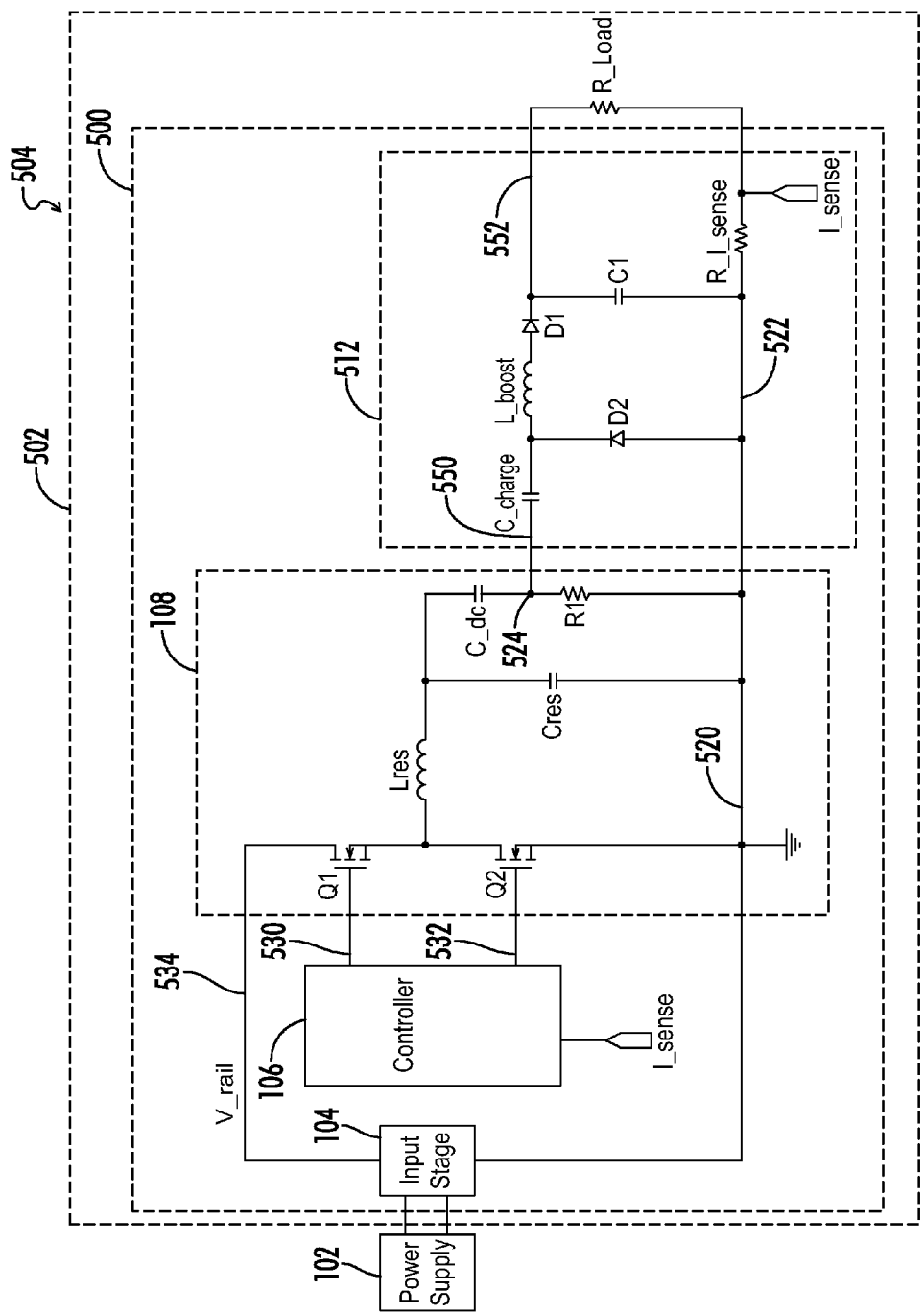
FIG. 4 is a block diagram and partial schematic of a non-isolated driver circuit including a boost type voltage doubler output stage.

Referring to FIG. 4, a light fixture 504 includes a housing 502, a non-isolated driver circuit with a boost type voltage doubler output stage 500, and a light source R_Load. In one embodiment, the load or light source R_Load may be a plurality of LEDs. The housing 502 is configured to support the light source R_load and the driver circuit 500. The housing 502 may include a lens for the one or more LEDs of the light source R_Load. The driver circuit 500 is configured to provide power from the power source 102 to the light source R_load. The light source R_load is operable to provide light in response to receiving power.

The driver circuit 500 includes an input stage 104 configured to receive power from the power source 102. In one embodiment, the input stage 104 includes an alternating current AC to DC converter, an electromagnetic interference (i.e., EMI) filter, and a power factor correction circuit for converting AC power from the power supply 102 to DC power rail V_rail. The DC power rail V_rail provides a constant DC voltage (e.g., a bias voltage) to various components of the driver circuit 500 (e.g., controller 106 and inverter 108). In another embodiment, the power supply 102 is a DC power source, and the input stage 104 includes an EMI filter and, optionally, a DC to DC converter or DC voltage regulator, depending on the voltage of the power supply 102 and the desired DC power rail V_rail voltage.

The driver circuit 500 further includes controller 106, inverter 108, and a voltage doubler output stage 512. The voltage doubler output stage 512 provides a current sensing signal I_sense to the controller 106. The controller 106 receives the output current sensing signal I_sense from the voltage doubler output stage 512 and provides a drive signal to the inverter 108 as a function of the current sensing signal I_sense. The output current sensing signal I_sense is indicative of an output current provided to the load R_Load (e.g., a light source) at an output of the voltage doubler output stage 512. In one embodiment, the controller 106 alters a frequency of the drive signal provided to the inverter 108 as a function of the current sensing signal I_sense to maintain the output current at a target current. The target current may be a default current or indicated by a dimming signal received at the controller 106 from a dimming circuit (not shown) or dimming controller (not shown).

The inverter 108 has a control input 530, 532, a power input 534, an output 524, and a circuit ground 520. The power input 534 is coupled to the DC power rail V_rail. The control input 530, 532 is coupled to the controller 106. The inverter 108 is configured to provide an AC output signal as a function of a drive signal received at the control input 530, 532 of the inverter 108. The inverter 108 includes an upper switch Q1, a lower switch Q2, a resonant inductor Lres, a resonant capacitor Cres, a DC blocking capacitor C_dc, and an output resistor R1. The resonant inductor Lres has a first terminal and a second terminal. The upper switch Q1 is connected between the DC power rail V_rail and a first terminal of the resonant inductor Lres. The lower switch Q2 is connected between the first terminal of the resonant inductor Lres and the circuit ground 520 of the inverter 108. The resonant capacitor Cres is connected between a second terminal of the resonant inductor Lres and the circuit ground 520 of the inverter 108. The DC blocking capacitor C_dc is connected between the second terminal of the resonant inductor Lres and the output 524 of the inverter 108. By changing the operating frequency of the half-bridge resonant inverter 108, the voltage across the resonant capacitor Cres can be controlled, as well as the output voltage and current of the inverter 108. In one embodiment, the drive signal provided by the controller 106 includes an upper switch signal and a lower switch signal. The upper switch signal is provided to a control terminal (e.g., gate) of the upper switch Q1, and the lower switch signal is provided to a control terminal of the lower switch Q2.

The voltage doubler output stage 512 has an input 550, an output 552, and a circuit ground 522. The output 522 is configured to connect to the light source R_load. The voltage doubler output stage 512 is configured to convert the AC output signal from the inverter 108 into a DC output signal for the light source or load R_load. The voltage doubler output stage 512 includes a boost inductor L_boost connected between the input 550 and the output 552 of the voltage doubler output stage 512. In one embodiment, the circuit ground 520 of the inverter 108 is connected to the circuit ground 522 of the voltage doubler output stage 512 such that the output 552 of the voltage doubler output stage 512 is not electrically isolated from the power input 534 and circuit ground 520 of the inverter 108.

In one embodiment, the voltage doubler output stage 512 further includes a charging capacitor C_charge, a first diode D1, a second diode D2, an output capacitor C1, and a current sensing resistor R_I_sense. The charging capacitor C_charge has a first terminal and a second terminal. The first terminal of the charging capacitor C_charge is connected to the input 550 of the voltage doubler output stage 512. The cathode of the first diode D1 is connected to the output 552 of the voltage doubler output stage 512. The cathode of the second diode D2 is connected to the second terminal of the charging capacitor C_charge, and the anode of the second diode D2 is connected to the circuit ground 522 of the voltage doubler output stage 512. The output capacitor C1 is connected between the cathode of first diode D1 and the circuit ground 522 of the voltage doubler output stage 512. The current sensing resistor R_I_sense has a first terminal and a second terminal. The first terminal of the current sensing resistor R_I_sense is connected to the circuit ground 522 of the voltage of where output stage 512, and the second terminal provides a current sensing signal indicative of a current through the light source R_load. The light source R_load is connected between the second terminal of the current sensing resistor R_I_sense and the cathode of the first diode D1 (i.e., the output 552 of the voltage doubler output stage 512). The boost inductor L_boost has a first terminal connected to the cathode of the second diode D2 and a second terminal connected to the anode of the first diode D1.

Figure 2:
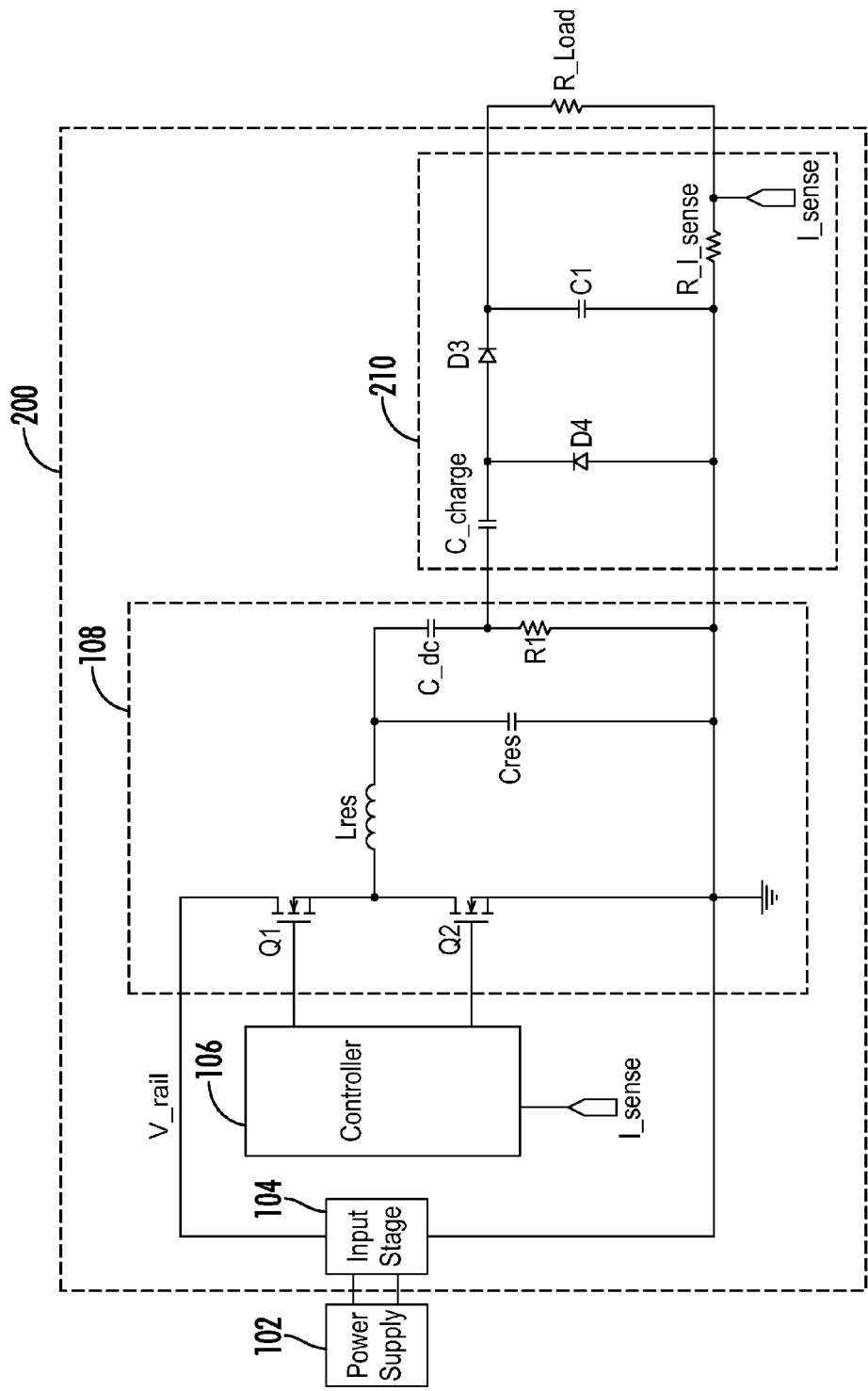
FIG. 2 is a block diagram and partial schematic of a non-isolated driver circuit including a voltage doubler output stage full bridge rectifier as known in the prior art.
Figure 3:
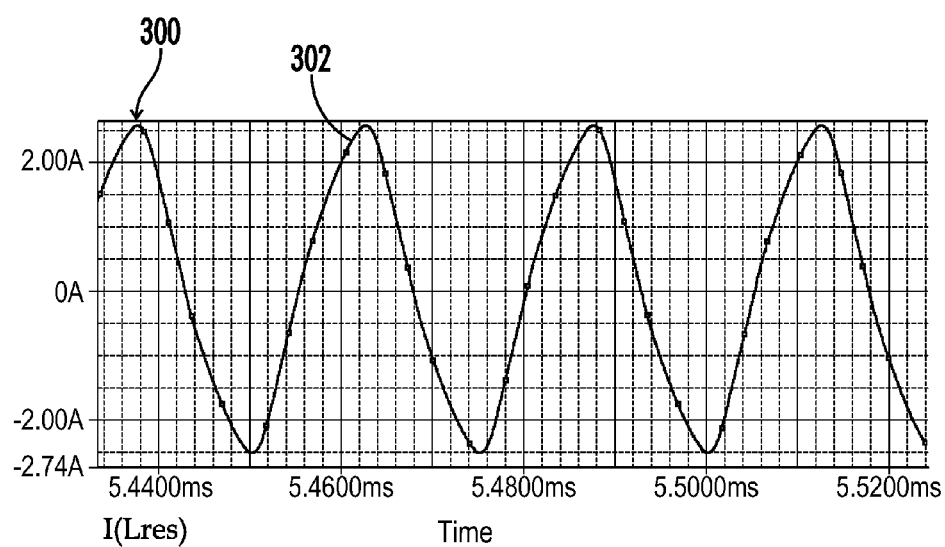
FIG. 3 is a plot of inverter resonant inductor current versus time for the driver circuit of FIG. 2.
Figure 5:
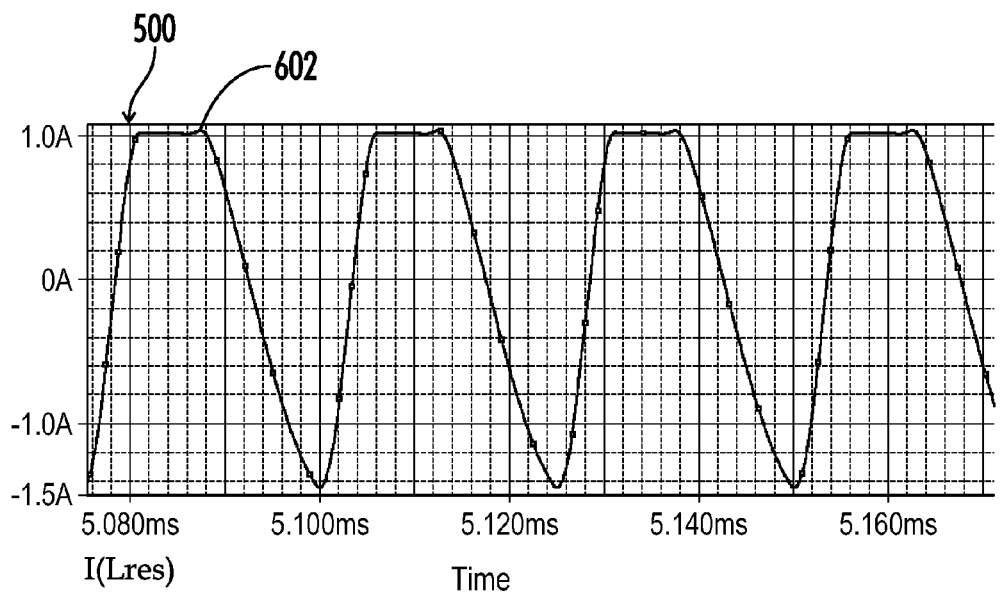
FIG. 5 is a plot of inverter resonant inductor current versus time for the driver circuit of FIG. 4.

The boost inductor L_boost provides a secondary component for energy storage, secondary to the charging capacitor C_charge. The charging capacitor C_charge stores energy when the second diode D2 is conducting, and the boost inductor L_boost stores energy when the first diode D1 is conducting. The addition of the boost inductor L_boost changes the shape of the current through the resonant inductor Lres of the inverter 108 as shown in the plot 600 of resonant inductor current versus time in FIG. 5. The resonant inductor current waveform 602 is a square top waveform which has a better current transmitting capacity than the sinusoid waveform 302 (see FIG. 3) produced by the non-isolated driver circuit with voltage doubler output stage 200 of FIG. 2. In the plot 600 of FIG. 5, the resonant inductor current waveform 602 has a 1.3 A negative peak and 1 A positive peak for a 700 mA DC output to the light source R_Load. Thus, a smaller, less complex resonant inductor Lres can be used in the inverter 108, and the upper switch Q1 and lower switch Q2 of the inverter 108 can be smaller (i.e., rated for lesser currents). Because the output of the voltage doubler output stage 512 is grounded to the circuit ground of the inverter 108, common mode noise is minimized, and the driver circuit 500 is more stable than the non-isolated driver circuit with full-wave rectifier output stage 100 of FIG. 1.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful NON-ISOLATED RESONANT DC-DC CONVERTER WITH BOOST-TYPE VOLTAGE DOUBLER OUTPUT it is not intended that such references be construed as limitations upon the scope of this invention except as set forth in the following claims.

What is claimed is:

1. A driver circuit for providing power from a power source to a load, said driver circuit comprising:
    an inverter having a control input, a power input, and an inverter output, wherein:
        the power input is configured to connect a direct current (DC) power rail; and
        the inverter is configured to provide an alternating current (AC) output signal as a function of a drive signal received at the control input of the inverter;
    a voltage doubler output stage having a voltage doubler input and a voltage doubler output, wherein:
        the voltage doubler output is configured to connect to the load;
        the voltage doubler input is coupled to the inverter output;
        the voltage doubler output stage is configured to convert the AC output signal from the inverter into a DC output signal; and
        the voltage doubler output stage comprises
            a first diode having an anode and a cathode,
            a second diode having an anode and a cathode,
            a charge capacitor having a first terminal coupled to the voltage doubler input and a second terminal coupled to the cathode of the second diode,
            a boost inductor having a first terminal connected to the cathode of the second diode and to the second terminal of the charge capacitor, and a second terminal connected to the anode of the first diode, and
            wherein the cathode of the first diode is coupled to the voltage doubler output.

2. The driver circuit of claim 1, wherein:
    the voltage doubler output stage further comprises a current sensing resistor configured to connect in series with the load when the load is connected to the voltage doubler output and to provide a current sensing signal indicative of a current through the load; and the driver circuit further comprises a controller having an output connected to the control input of the inverter, wherein the controller is configured to receive the current sensing signal and provide the drive signal to the control input of the inverter as a function of the received current sensing signal.

3. The driver circuit of claim 1, wherein:
the power source is a DC power source configured to provide DC power to the driver circuit; and
the driver circuit further comprises an input stage, said input stage comprising:
a DC to DC converter configured to receive the DC power and provide the DC power rail.

4. The driver circuit of claim 1, wherein:
the power source is an AC power source configured to provide AC power to the driver circuit; and
the driver circuit further comprises an input stage, said input stage comprising:
an electromagnetic interference (EMI) filter configured to connect to the power source and filter noise from the AC power provided by the AC power source; and
an AC to DC converter configured to receive the filtered AC power from the EMI filter and provide the DC power rail.

5. The driver circuit of claim 1, wherein:
the inverter has a circuit ground;
the voltage doubler output stage has a circuit ground; and
the circuit ground of the voltage doubler output stage is connected to the circuit ground of the inverter such that the output of the voltage doubler output stage is not electrically isolated from the power input of the inverter.

6. The driver circuit of claim 1, wherein the voltage doubler output stage further comprises:
an output capacitor connected between the cathode of the first diode and a circuit ground of the voltage doubler output stage; and
a current sensing resistor having a first terminal and a second terminal, wherein the first terminal is connected to the circuit ground of the voltage doubler output stage and the second terminal provides a current sensing signal indicative of a current through the load; and wherein:
the load connects between the second terminal of the current sensing resistor and the cathode of the first diode.

7. The driver circuit of claim 1, wherein:
the voltage doubler output stage is configured to provide a current sensing signal indicative of a current through the load;
the driver circuit further comprises a controller configured to receive the current sensing signal and provide the drive signal to the inverter as a function of the received current sensing signal; wherein the drive signal comprises a upper switch signal and a lower switch signal and the controller is configured to provide the upper switch signal to an upper switch of the inverter and to provide the lower switch signal to a lower switch of the inverter.

8. The driver circuit of claim 1, wherein the inverter comprises:
a resonant inductor having a first terminal and a second terminal;
an upper switch connected between the DC power rail and a first terminal of the resonant inductor;
a lower switch connected between the first terminal of the resonant inductor and a circuit ground of the inverter;
a resonant capacitor connected between a second terminal of the resonant inductor and the circuit ground of the inverter;
a DC blocking capacitor connected between the second terminal of the resonant inductor and the output of the inverter; and
an output resistor connected between the output of the inverter and the circuit ground of the inverter.

9. A light fixture comprising:
a light source operable to provide light in response to receiving power;
a driver circuit configured to provide power from a power source to the light source, said driver circuit comprising:
an inverter having a control input, a power input, and an output, wherein:
the power input is connected to a direct current (DC) power rail; and
the inverter is configured to provide an alternating current (AC) output signal as a function of a drive signal received at the control input of the inverter;
a voltage doubler output stage having an input and an output, wherein:
the output is configured to connect to the light source;
the input of the voltage doubler output stage is connected to the output of the inverter;
the voltage doubler output stage is configured to convert the AC output signal from the inverter into a DC output signal; and
the voltage doubler output stage comprises
a first diode having an anode and a cathode,
a second diode having an anode and a cathode,
a charge capacitor having a first terminal coupled to the input of the voltage doubler output stage and a second terminal coupled to the cathode of the second diode,
a boost inductor having a first terminal connected to the cathode of the second diode and to the second terminal of the charge capacitor, and a second terminal coupled to the anode of the first diode, and
wherein the cathode of the first diode is coupled to the output of the voltage doubler output stage; and
a housing configured to support the light source and the driver circuit.

10. The light fixture of claim 9, wherein:
the voltage doubler output stage further comprises a current sensing resistor configured to connect in series with the light source when the light source is connected to the output of the voltage doubler output stage and provide a current sensing signal indicative of a current through the light source; and
the driver circuit further comprises a controller having an output connected to the control input of the inverter, wherein the controller is configured to receive the current sensing signal and provide the drive signal to the control input of the inverter as a function of the received current sensing signal.

11. The light fixture of claim 9, wherein:
the power source is a DC power source configured to provide DC power to the driver circuit; and
the driver circuit further comprises an input stage, said input stage comprising:
a DC to DC converter configured to receive the DC power and provide the DC power rail.

12. The light fixture of claim 9, wherein:
the power source is an AC power source configured to provide AC power to the driver circuit; and
the driver circuit further comprises an input stage, said input stage comprising:

an electromagnetic interference (EMI) filter configured to connect to the power source and filter noise from the AC power provided by the AC power source; and
an AC to DC converter configured to receive the filtered AC power from the EMI filter and provide the DC power rail.

13. The light fixture of claim 9, wherein:
the inverter has a circuit ground;
the voltage doubler output stage has a circuit ground; and
the circuit ground of the voltage doubler output stage is connected to the circuit ground of the inverter such that the output of the voltage doubler output stage is not electrically isolated from the power input of the inverter.

14. The light fixture of claim 9, wherein
the light source connects between the cathode of the first diode and the circuit ground of the voltage doubler output stage.

15. The light fixture of claim 9, wherein:
the voltage doubler output stage is configured to provide a current sensing signal indicative of a current through the light source;
the driver circuit further comprises a controller configured to receive the current sensing signal and provide the drive signal to the inverter as a function of the received current sensing signal; wherein the drive signal comprises a upper switch signal and a lower switch signal and the controller is configured to provide the upper switch signal to an upper switch of the inverter and to provide the lower switch signal to a lower switch of the inverter.

16. The light fixture of claim 9, wherein the inverter comprises:
a resonant inductor having a first terminal and a second terminal;
an upper switch connected between the DC power rail and a first terminal of the resonant inductor;
a lower switch connected between the first terminal of the resonant inductor and a circuit ground of the inverter;
a resonant capacitor connected between a second terminal of the resonant inductor and the circuit ground of the inverter;
a DC blocking capacitor connected between the second terminal of the resonant inductor and the output of the inverter; and
an output resistor connected between the output of the inverter and the circuit ground of the inverter.

17. A DC-DC converter comprising:
a DC input including a DC power rail and a DC input circuit ground;
a converter output including load terminals configured to couple to a load;
an inverter circuit having an inverter input coupled to the DC power rail and an inverter output, the inverter circuit including a resonant inductor and a resonant capacitor;
a voltage doubler circuit having a voltage doubler input coupled to the inverter output and a voltage doubler output coupled to the load terminals;
wherein the voltage doubler circuit comprises
a first diode having an anode and a cathode,
a second diode having an anode and a cathode,
a charge capacitor having a first terminal coupled to the voltage doubler input and a second terminal coupled to the cathode of the second diode,
a boost inductor having a first terminal connected to the cathode of the second diode and to the second terminal of the charge capacitor, and a second terminal coupled to the anode of the first diode;
wherein the cathode of the first diode is coupled to the voltage doubler output; and
wherein one of the load terminals is an output common terminal electrically coupled to the DC input circuit ground.

18. The DC-DC converter of claim 17 wherein:
the voltage doubler further comprises a current sensing resistor coupled to one of the load terminals and configured to provide a current sensing signal indicative of a current through a load when the load is connected to the load terminals;
the DC-DC converter further comprises a controller having an output connected to an inverter control input; and
the controller is configured to receive the current sensing signal and provide a control signal to the inverter control input as a function of the received current sensing signal.

* * * * *